United States Patent
Black

[19]

[11] Patent Number: 5,839,783
[45] Date of Patent: Nov. 24, 1998

[54] PORTABLE GROUND-BASED SEAT

[76] Inventor: Jeffrey E. Black, 4727 Cree La., Cleveland, Tenn. 37312

[21] Appl. No.: 870,787
[22] Filed: Jun. 6, 1997
[51] Int. Cl.$^6$ ...................................................... B60N 2/02
[52] U.S. Cl. ........................... 297/380; 297/4; 297/423.28
[58] Field of Search ................................ 297/380, 378.1, 297/423.28, 423.26, 4, 16.1, 118, 250.1, 254, 255, 183.7, 423.12; 182/187, 188

[56] References Cited

U.S. PATENT DOCUMENTS

| | | |
|---|---|---|
| 1,355,005 | 10/1920 | Schechter . |
| 1,625,106 | 4/1927 | Sullivan . |
| 1,963,708 | 6/1934 | Marvin . |
| 4,600,082 | 7/1986 | Rauls . |
| 4,601,364 | 7/1986 | York . |
| 4,705,143 | 11/1987 | Ziemba . |
| 5,118,163 | 6/1992 | Brittizan et al. ...................... 297/254 X |
| 5,364,163 | 11/1994 | Hardison ................................. 297/4 X |
| 5,413,192 | 5/1995 | Wollen et al. ....................... 182/188 X |
| 5,439,074 | 8/1995 | Trout et al. ............................... 182/187 |
| 5,450,927 | 9/1995 | Harton et al. ........................ 182/188 X |
| 5,462,135 | 10/1995 | Ambler et al. ....................... 182/188 X |
| 5,538,101 | 7/1996 | Kempf ................................ 182/187 X |
| 5,620,227 | 4/1997 | Brune ................................. 297/380 X |

FOREIGN PATENT DOCUMENTS

| | | | |
|---|---|---|---|
| 249772 | 8/1926 | Italy ....................................... 297/255 |
| 62304 | 12/1912 | Switzerland ........................... 297/380 |

*Primary Examiner*—Milton Nelson, Jr.
*Attorney, Agent, or Firm*—Haverstock, Garrett & Roberts

[57] ABSTRACT

A ground-based seat, including a back structure, a seat structure, seat structure support, a foot structure, and foot structure support is described. The back structure includes a top portion, a bottom portion, a front face, and a rear face. The seat structure includes a front portion, a rear portion, a top face and a bottom face, the rear portion of the seat structure being pivotally connected to the bottom portion of the back structure to allow relative rotation of the two structures. The seat structure support extends between the back structure and the seat structure and is positionable for preventing rotation of the seat structure downward and away from the back structure when a person is seated in the seat. The seat structure support may also be configured to allow the seat structure to be positioned substantially parallel to the back structure such that the bottom face of the seat structure lies adjacent the rear face of the back structure. The foot structure includes first and second sides for placement of a user's feet and the foot structure support extends between the front portion of the seat structure and the foot structure. The ground-based seat is also adapted for positioning on terrain of varying slopes.

13 Claims, 4 Drawing Sheets

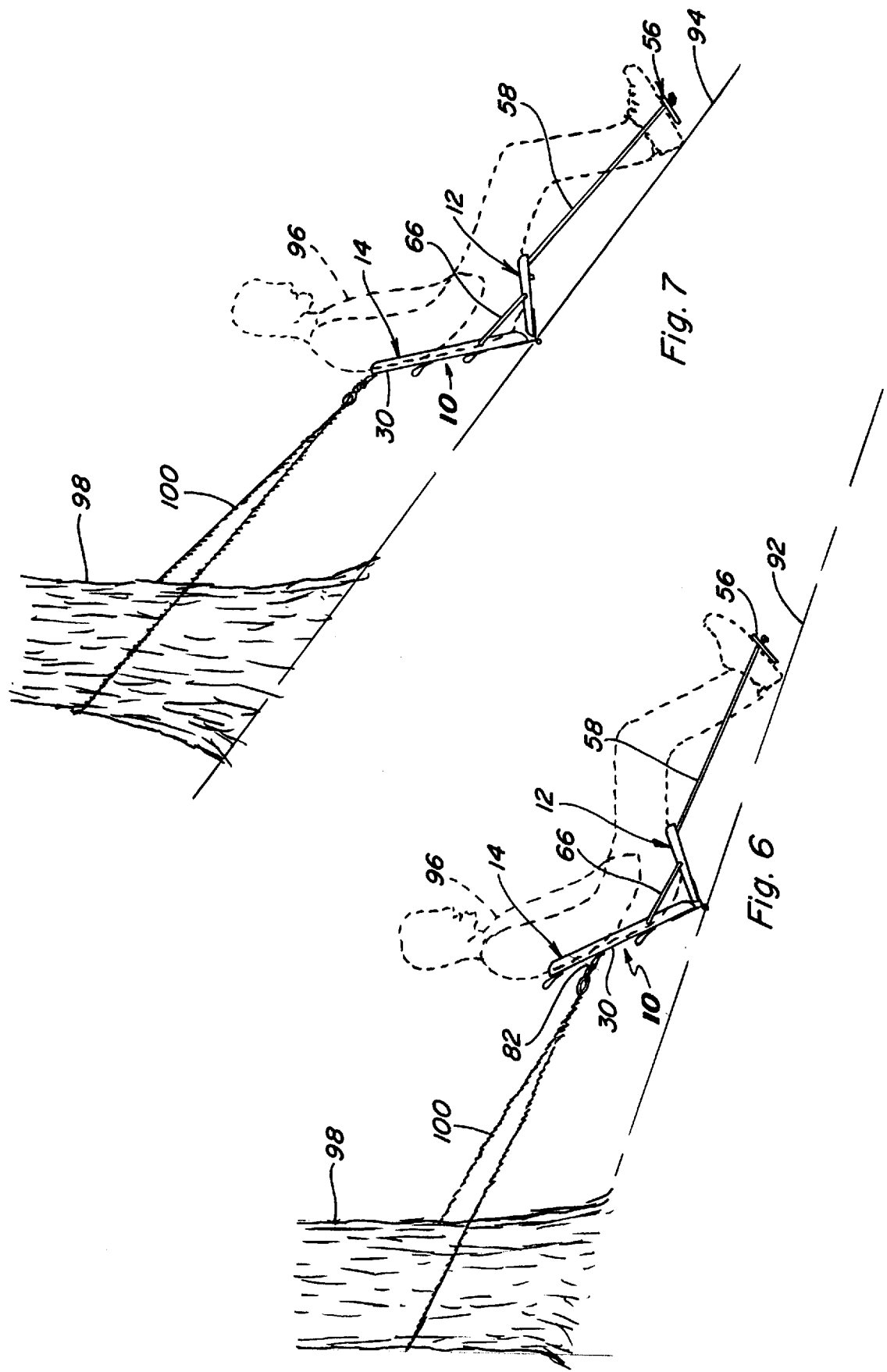

PORTABLE GROUND-BASED SEAT

FIELD OF THE INVENTION

This invention relates generally to a portable seat and more particularly, to a ground-based portable seat which is adapted for use on terrain of varying slopes including both flat terrain and steep terrain.

BACKGROUND OF THE INVENTION

In sporting activities such as hunting, it is desirable for a person to find a location to sit and observe the surroundings. There are essentially two main techniques for hunting, namely hunting from a treestand or hunting from the ground. In the past, a variety of types of treestands have been available to and used by hunters. Hunters may choose not to utilize such treestands for a number of reasons, including the hunter's poor physical condition, the cumbersome weight of treestands, the hunter's fear of heights or accidental falls, or the hunter's age. Ground-based hunter's are faced with the time-consuming problem of finding a suitable place to sit. Although portable ground-based seats exist, none are capable of providing the hunter with the ability to sit on terrain of varying slopes. In particular, existing seats do not provide the hunter with the ability to comfortably sit on both flat terrain and steep sloped terrain. Further, in the past many portable ground-based seats have been unnecessarily heavy and/or otherwise difficult to carry.

Accordingly, it is desirable and advantageous to provide a portable ground-based seat which is adapted for use on terrain of varying slopes including flat terrain and steep terrain. It also is desirable and advantageous to provide a portable ground-based seat which is lightweight and easily carried.

An object of the present invention is to provide a portable ground-based seat which may be utilized on both flat terrain and steep sloped terrain, as well as terrains having slopes therebetween.

Another object of the present invention is to provide a portable ground-based seat which includes a foot structure and foot structure support means for enabling the user to stabilize the seat.

Yet another object of the present invention is to provide a portable ground-based seat which is convenient to carry and can be set up in a short amount of time.

SUMMARY OF THE INVENTION

These and other objects of the invention are attained by an apparatus which, in one embodiment, is a ground-based seat, including a back structure, a seat structure, seat structure support means, a foot structure, and foot structure support means. The back structure includes a top portion, a bottom portion, a front face, and a rear face. The seat structure includes a front portion, a rear portion, a top face and a bottom face, the rear portion of the seat structure being pivotally connected to the bottom portion of the back structure to allow relative rotation of the two structures so as to adjust the angular relationship of the two structures. Both the seat structure and the back structure may be formed of a sturdy material such as wood, metal, or high strength plastic, and may include a cushioned covering for comfort. The seat structure support means extends between the back structure and the seat structure and is positionable for preventing rotation of the seat structure downward and away from the back structure when a person is seated in the seat. The seat structure support means may also be configured to allow the seat structure to be positioned substantially parallel to the back structure such that the bottom face of the seat structure lies adjacent the rear face of the back structure.

The foot structure includes first and second sides for placement of a user's feet and the foot structure support means extends between the front portion of the seat structure and the foot structure. The foot structure support means includes first support means extending between the front portion of the seat structure and the first side of the foot structure and second support means extending between the front portion of the seat structure and the second side of the foot structure. The support means utilized may preferably take the form of a high strength, plastic coated cable. However, it is understood that the support means might also be formed from other suitable means, including, but not limited to, a rope, chain, or nylon strap, and that such support means may be adapted for adjusting the length thereof. Further, the support means preferably permits the angular position of the foot structure relative to the seat structure to vary according to the type of terrain in which the seat is used.

In one embodiment of the invention the seat structure support means includes a cable support member connected to the rear face of the back structure and a cable having a first side connected at a first location on the seat structure and a second side connected at a second location on the seat structure, the cable including a mid point engaging the cable support member on the rear face of the back structure. The mid point of the cable is disengageable from the cable support member to allow the seat structure to be positioned substantially parallel to the back structure such that the bottom face of the seat structure lies adjacent the rear face of the back structure. Although use of a high strength cable is preferred, it is understood that similar means such as a rope, chain, or nylon strap might be utilized for supporting the seat structure relative to the back structure.

Further, the present portable seat may include a plurality of attachment means located on the rear face of the back structure for selectively attaching the portable seat to a support rope, cable, chain, or other suitable means, at least one of the attachment means being located near the top portion of the back structure and at least one other attachment means being located below the aforesaid attachment means. The attachment means utilized in a given situation is selected according to the slope of the terrain on which the seat is to be used. The attachment means may be formed from, for example, loops of nylon strap, metal hook members, or, in the case of a back structure formed from plastic, the attachment means may be formed integrally therewith.

The seat according to the present invention is therefore advantageous in that it enables a person, such as a hunter, to sit comfortably and safely in a variety of types of settings, including on level terrain and on steep sloped terrain. Further, the seat is relatively lightweight, convenient to carry, and can be set up quickly.

BRIEF DESCRIPTION OF THE DRAWINGS

FIG. 6 is a side view of the seat of FIG. 1 as used on medium sloped terrain; and FIG. 7 is a side view of the seat of FIG. 1 as used on steep sloped terrain.

DETAILED DESCRIPTION OF THE DRAWINGS

Figure 1:
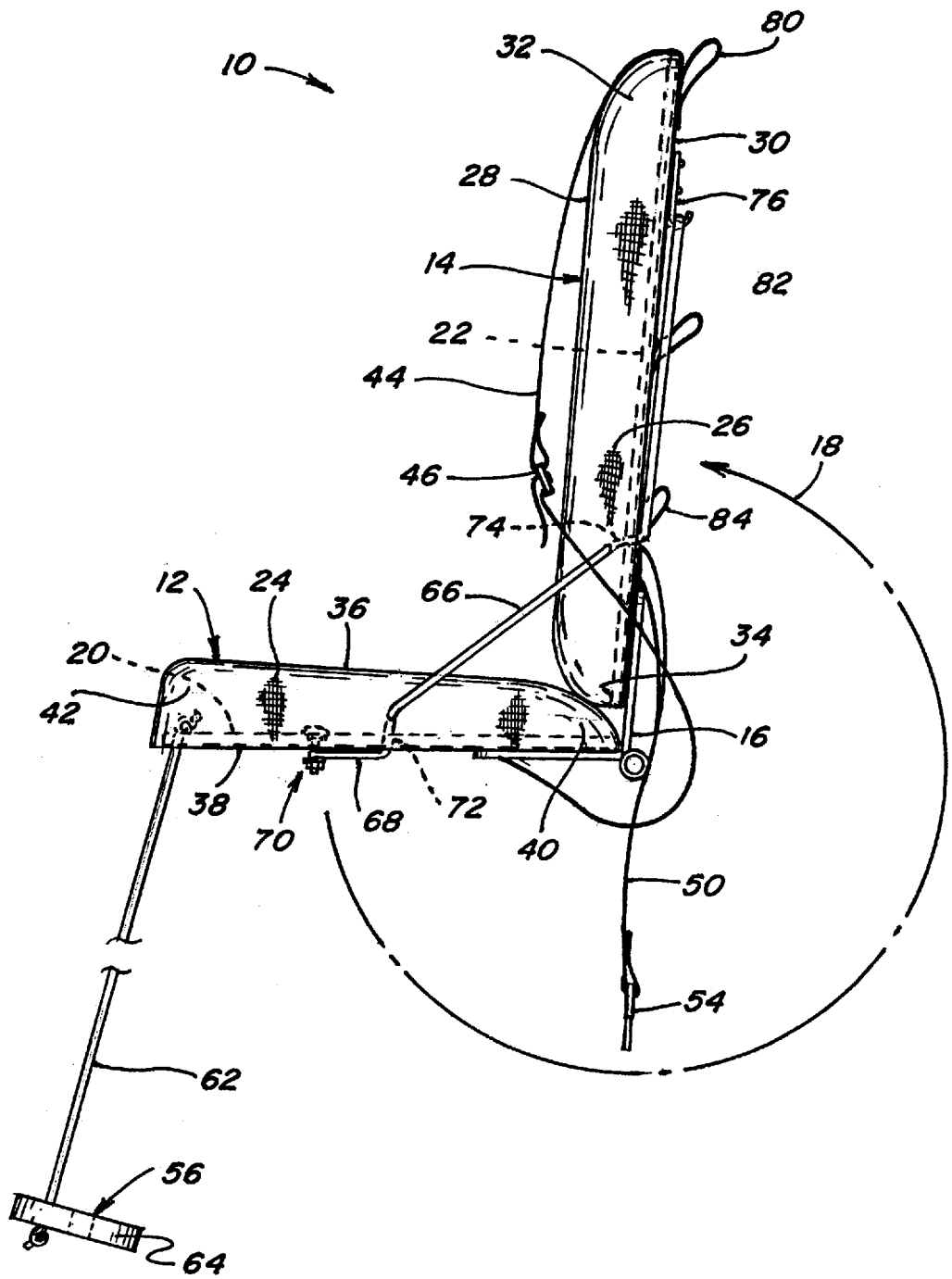
FIG. 1 is a side elevational view of a seat according to one embodiment of the present invention in an unfolded configuration.

Referring now to the drawings, number 10 in FIG. 1 depicts a portable ground-based seat in accordance with one embodiment of the present invention. The seat includes a seat structure 12 and a back structure 14, the seat structure 12 pivotally connected to the back structure 14, such as by one or more hinge members 16. The pivotal connection allows the seat structure to be rotated downward and around toward the back structure as depicted by arrow 18. In the illustrated embodiment both the back structure and seat structure may be formed from a relatively hard base material such as wood which is shown in shadow at 20 and 22. The base material 20 and 22 may then be covered with a cushion material for comfort, such as foam rubber, and then a cloth or other cover material 24 and 26 which may preferably be weather resistant. The back structure includes a front face 28, a rear face 30, a top portion 32 and a bottom portion 34. Similarly, the seat structure includes a top face 36, a bottom face 38, a rear portion 40, and a front portion 42.

Figure 2:
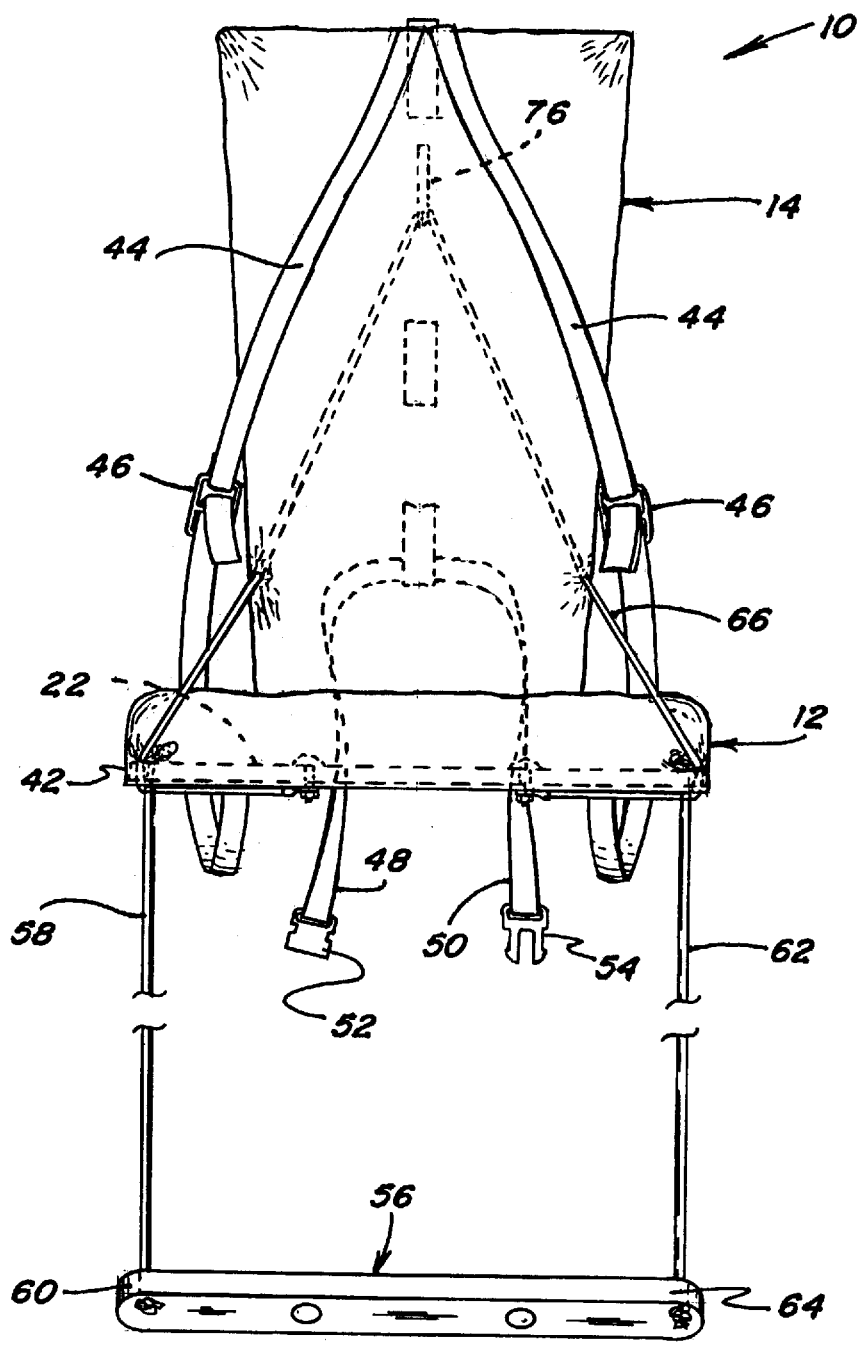
FIG. 2 is a front view of the seat of FIG. 1.

Shoulder straps 44 which may be used to conveniently carry the seat in backpack fashion have one end connected near the top portion of the back structure and one end connected near the rear portion of the seat structure. The straps are preferably formed of nylon and include clips 46 which provide for adjustment of the straps. As best seen in FIG. 2, a waist strap includes a first strap portion 48 and second strap portion 50, the ends of which are connectable by interlocking connectors 52 and 54. The waist strap may be connected around a user's waist when seated in the seat for security, particularly in steep sloped terrain applications.

A foot support structure 56 includes foot structure support means extending between the front portion 42 of the seat structure 12 and the foot structure 56. Such illustrated support means includes first support means 58 extending between the front portion 42 of the seat structure 12 and a first side 60 of the foot structure 56 and second support means 62 extending between the front portion 42 of the seat structure 12 and the second side 64 of the foot structure 56. Each support means 58 and 62 may be formed, for example, from a high strength steel cable, a rope, a chain, a nylon strap or other suitable means. Each support means may also be configured for adjustment by the user. For example, if nylon straps are utilized, adjustment clips such as 46 could be provided for adjusting the length of the straps.

When in use, the seat structure is angularly positioned relative to the back structure as shown in FIG. 1, seat structure support means being utilized to maintain such angular position. In this regard, such seat structure support means may include a high strength cable 66 having a first end 68 connected at a first location on the seat structure 12, such as through the use of the bolt-type connection 70 shown. The cable 66 extends from the bottom face of the seat structure, through the seat structure as shown at 72, toward the back structure 14, through the back structure 14 as shown at 74, and up toward a cable support member 76. The cable support member 76 may be, for example, formed from a hook which is attached to the rear face 30 of the back structure 14. A mid-point of the cable 66 engages the cable support member 76 and then passes back through the back structure 14 and the seat structure 12, and the opposite side of the cable 66 is similarly connected to a second location on the seat structure 12. To allow for the rotation illustrated by arrow 18 in FIG. 1, the cable 66 may be disengaged from the cable support member 76. Although a single cable 66 is shown, it is recognized that two distinct cables could be utilized, each having one end engageable with the cable support member 76. Further, if two distinct cables were utilized, it is recognized that two distinct cable support members could be included on the rear face 30 of the back structure 14. The height of the cable 66 before passing through to the rear face 30 of the back structure is preferably relatively low as shown, less than about one half the height of the back structure 14, so that the cable will not interfere with a persons arms as they are seated therein. This is particularly advantageous in hunting applications where a hunter needs to be able to freely, quickly, and quietly move his/her arms.

Also positioned on the rear face of the back structure are a plurality of attachment means 80, 82, and 84, including at least one attachment means 80 located near the top portion 32 of the back structure and at least one other attachment means 82 or 84 located below the attachment means 80. Such attachment means may be utilized for supporting the seat when on non-level terrain as described below with reference to FIGS. 6 and 7.

Figure 3:
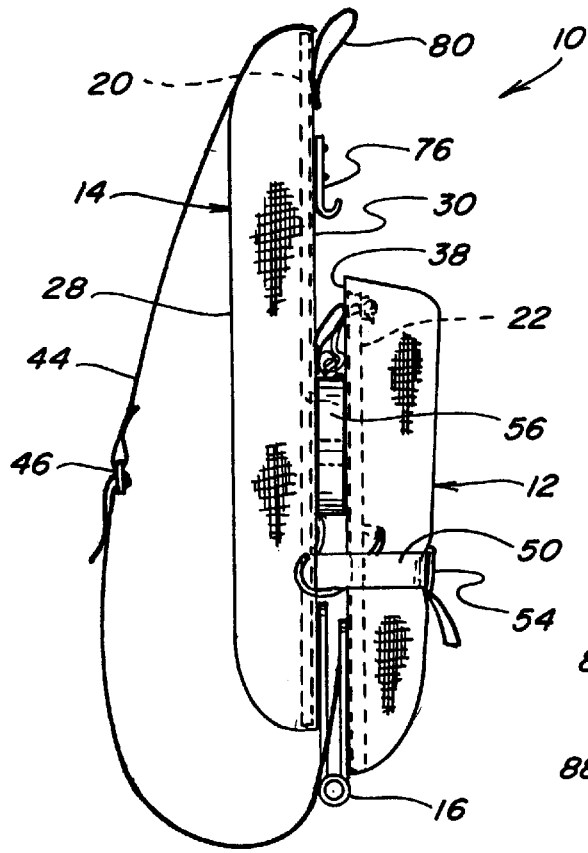
FIG. 3 is a side elevational view of the seat of FIG. 1 in a folded configuration.

When carried, the seat structure 12 is rotated such that the bottom face 38 thereof lies adjacent the rear face 30 of the back structure 14, as shown in FIG. 3. This folded configuration is particularly advantageous in that the cushioned front face 28 of the back structure 14 is positioned against a person's back as it is carried. The foot support structure 56 may also be positioned between the seat structure 12 and the back structure 14 as shown to facilitate carrying, the two structures being held in relative position by the straps 50 and 52 and clips 54 and 56.

Figure 4:
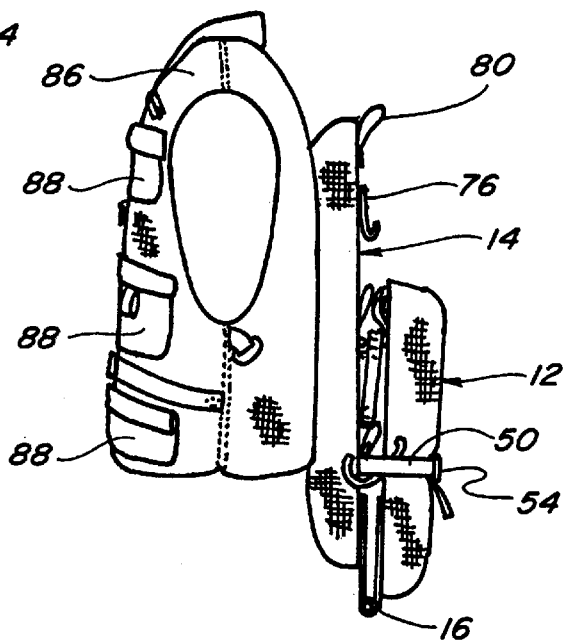
FIG. 4 is a side elevational view of an alternative embodiment of the seat including a vest attached thereto.

In an alternative embodiment of the portable ground-based seat of the present invention, shown in FIG. 4, a vest 86 is attached to the back structure 14, in place of straps 44 (FIG. 3), for purposes of carrying the seat. The vest 86 may be attached to the back structure by being sewn thereto. Further, the vest 86 may include pockets 88, such pockets 88 being particularly useful to hunters. When properly positioned the vest 86 can be worn by the user both when carrying the seat and when seated therein.

Figure 5:
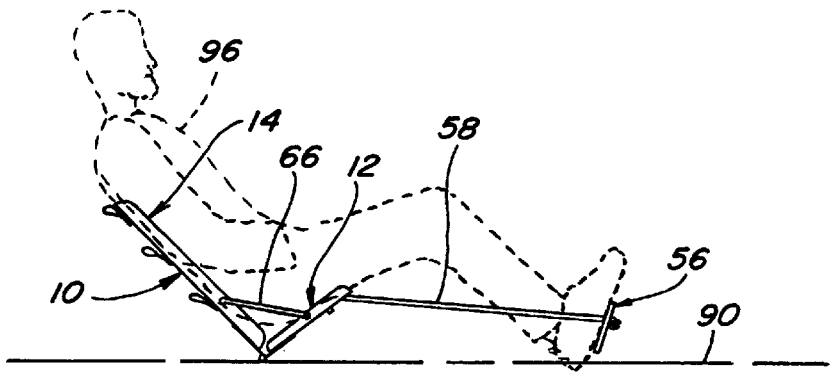
FIG. 5 is a side view of the seat of FIG. 1 as used on flat terrain.

Other advantages of the ground-based seat 10 of the present invention are best seen with reference to FIGS. 5–7, wherein use of the seat is depicted on varying levels of terrain, including flat terrain 90 in FIG. 5, medium sloped terrain 92 in FIG. 6, and steep sloped terrain 94 in FIG. 7. As seen from FIG. 5, when used on flat terrain 90, the seat 10 does not require attachment to any form of support. Rather, the seat 10 is adapted to be positioned on the ground with the user 96 determining the particular angle at which he/she sits. In particular, the region of attachment between the seat structure 12 and the back structure 14 is generally positioned on the ground 90 and serves as a pivot location for the seat. A user 96 can lean the seat back as shown without the seat falling uncontrollably backward because at the same time that the seat 10 is leaned back the user can exert a force on the foot structure 56 with his/her legs. The force exerted by the user's legs acts on the front portion of the seat structure 12 through the foot structure support means 58 and 62 and therefore counters any tendency of the seat 10 to fall backward. In essence, the user 96 exerts enough force to reach a state of equilibrium about the pivot location such that a particular rearward tilt can be maintained if desired.

As seen in FIG. 6, when the seat is used on medium sloped terrain 92, the seat is preferably attached to some type of support 98, such as the illustrated tree. Attachment to the support 98 can be through use of a rope, steel cable, chain, nylon strap, or other suitable means. The support rope 100, for example, can be secured to the support 98 and then secured to one of the plurality of attachment means located on the rear face 30 of the back structure 14. In particular, in terrain that is of a medium or lesser slope one of the lower attachment means might be utilized, such as the attachment means 82 as shown. If the attachment means is a loop of nylon strap or an eye ring member, the rope 100 could be pulled therethrough. It is also recognized and understood that a variety of types of connectors could be utilized. The rope 100 helps stabilize the seat 10 and prevent it from sliding down the slope 92. Referring to FIG. 7, when the seat 10 is used on steep sloped terrain 94, a similar rope 100 and support 98 are utilized. However, on the steeper slope 94 the higher attachment means 80 is preferably utilized in order to provide increased support for the seat 10 about the pivot location. Thus, it is seen that the plurality of attachment means 80, 82, and 84 make the seat particularly suitable for use on slopes of varying grades. In both FIGS. 6 and 7 it is further seen that the foot support structure 56 is still utilized by the user 96 for seat stability.

From the preceding description of the illustrated embodiment, it is evident that the objects of the invention are attained. In particular, a portable ground-based seat which is particularly suited for use on terrain of varying slopes, including level terrain and steep sloped terrain has been provided. Further, a seat which is easily carried and set up has also been provided. In hunting applications in particular, use of the seat enables a hunter to choose from a much wider variety of locations for hunting, including terrains which have previously been considered unacceptable for hunting due to their steepness. Although the invention has been described and illustrated in detail, it is to be clearly understood that the same is intended by way of illustration and example only and is not to be taken by way of limitation.

In particular, the exact shape of the seat structure and back structure could be varied. Further, although it is preferred that both the back and seat structure include some type of cushioned covering, it is understood that the same is not critical to the present invention. With respect to the location of the cable support member or members, it is recognized that they might be located on a side of the back structure. Also, although only one cable support member is shown on the rear face of the back structure, it is contemplated that more than one such member could be positioned thereon at different heights such that the angular relationship between the seat structure and back structure could be varied if desired. Still further, the exact configuration of the foot support structure could also be varied. Accordingly, the spirit and scope of the invention are to be limited only by the terms of the appended claims.

What is claimed is:

1. A ground-based seat, comprising:
   a back structure, a seat structure, seat structure support means, a foot structure, and foot structure support means;
   the back structure including a top portion, a bottom portion, a front face, and a rear face;
   the seat structure including a front portion, a rear portion, a top face and a bottom face, the rear portion of the seat structure pivotally connected to the bottom portion of the back structure to allow relative rotation of the two structures;
   the seat structure support means extending between the back structure and the seat structure, the seat structure support means positionable for preventing rotation of the seat structure downward and away from the back structure when a person is seated in the seat;
   the foot structure including first and second sides;
   the foot structure support means extending between the front portion of the seat structure and the foot structure and including first support means extending between the front portion of the seat structure and the first side of the foot structure and second support means extending between the front portion of the seat structure and the second side of the foot structure, said first and second support means positionable to permit a person sealed therein to exert a force on the seat structure by the person placing at least one foot on the foot structure and exerting a force thereon, such force being transmitted by the foot structure support means so as to act on the seat structure; and
   a plurality of attachment means located on the rear face of the back structure for selectively attaching the seat to a support rope, at least one of the attachment means located near the top portion of the back structure and at least one other attachment means located below the aforesaid attachment means.

2. The ground-based seat, as set forth in claim 1, wherein the seat structure is attached to the back structure by at least one hinge.

3. The ground-based seat, as set forth in claim 1, wherein a length of the first support means and a length of the second support means of the foot structure support means are adjustable.

4. The ground-based seat, as set forth in claim 1, further comprising at least two adjustable carrying straps adapted to allow a person to carry the seat on their back.

5. The ground-based seat, as set forth in claim 1, further comprising a vest attached to the back structure.

6. The ground-based seat, as set forth in claim 1, further comprising a cable support member connected to the rear face of the back structure, wherein the seat structure support means includes a cable having a first side connected at a first location on the seat structure and a second side connected at a second location on the seat structure, the cable including a mid point engaging the cable support member on the rear face of the back structure.

7. The ground-based seat, as set forth in claim 6, wherein the mid point of the cable is disengageable from the cable support member to allow the seat structure to be positioned substantially parallel to the back structure such that the bottom face of the seat structure lies adjacent the back face of the back structure.

8. A portable ground-based seat adapted for carrying by the user, the seat comprising:
   a back structure, a seat structure, and seat structure support means;
   the back structure including a top portion, a bottom portion, a front face, and a rear face;
   the seal structure including a front portion, a rear portion, a top face and a bottom face, the rear portion of the seat structure pivotally connected to the bottom portion of the back structure to allow relative rotation of the two structures;
   the seat structure support means extending between the back structure and the seat structure, the seat structure support means positionable for preventing rotation of the seat structure downward and away from the back structure when a person is sealed in the portable seat, the seat structure support means further positionable for allowing the seat structure to be positioned substantially parallel to the back structure such that the bottom face of the seat structure lies adjacent the rear face of the back structure; and a cable support member connected to the rear face of the back structure, wherein the seal structure support means includes a cable having a first side connected at a first location on the seat structure and a second side connected at a second location on the seat structure, the cable including a mid point engaging the cable support member on the rear face of the back structure.

9. The portable ground-based seat, as set forth in claim 8, further comprising a foot structure and foot structure support means, the foot structure including first and second sides, the foot structure support means extending between the front portion of the seat structure and the foot structure and including first support means extending between the front portion of the seat structure and the first side of the foot structure and second support means extending between the front portion of the seat structure and the second side of the foot structure.

10. A ground-based seat configured for use on terrain of varying slopes including flat terrain and steep terrain, the ground-based seat adapted for attachment to a supporting object by a support rope, the seat comprising:

a back structure, a seat structure, and seat structure support means;

the back structure including a top portion, a bottom portion, a front face, and a rear face, the rear face having a plurality of attachment means located thereon for selectively attaching the seat to the support rope, at least one of the attachment means located near the top portion of the back structure and at least one other attachment means located below the aforesaid attachment means;

the seat structure including a front portion, a rear portion, a top face and a bottom face, the rear portion of the seat structure pivotally connected to the bottom portion of the back support structure to allow relative rotation of the two structures; and the seat structure support means extending between the back structure and the seat structure, the seat structure support means positionable for preventing rotation of the seat structure downward and away from the back structure when a person is seated in the seat, the seat structure support means further positionable for allowing the seat structure to be positioned substantially parallel to the back structure such that the bottom face of the seat structure lies adjacent the rear face of the back structure.

11. The ground-based seat, as set forth in claim 10, wherein each of the attachment means comprises a nylon strap.

12. The ground-based seat, as set forth in claim 10, further comprising a foot structure and foot structure support means, the foot structure including first and second sides, and the foot structure support means extending between the front portion of the seat structure and the foot structure, the foot structure support means including first support means extending between the front portion of the seat structure and the first side of the foot structure and second support means extending between the front portion of the seat structure and the second side of the foot structure.

13. The ground-based seat, as set forth in claimed 12, wherein each of the attachment means comprises a hook member.

\* \* \* \* \*

UNITED STATES PATENT AND TRADEMARK OFFICE
CERTIFICATE OF CORRECTION

PATENT NO. : 5,839,783
DATED : November 24, 1998
INVENTOR(S) : Jeffrey E. Black

It is certified that error appears in the above-identified patent and that said Letters Patent is hereby corrected as shown below:

Column 6, line 15, "sealed" should be --seated--

Column 6, line 58, "seal" should be --seat--

Column 7, line 1, "sealed" should be --seated--

Column 7, line 8, "seal" should be --seat--

Signed and Sealed this

Sixteenth Day of March, 1999

*Attest:*

Q. TODD DICKINSON

*Attesting Officer*  Acting Commissioner of Patents and Trademarks